US012803208B2

(12) United States Patent
Ito

(10) Patent No.: US 12,803,208 B2
(45) Date of Patent: Nov. 17, 2026

(54) RELAY CONNECTOR

(71) Applicant: SUMITOMO WIRING SYSTEMS, LTD., Mie (JP)

(72) Inventor: Junya Ito, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 359 days.

(21) Appl. No.: 18/420,224

(22) Filed: Jan. 23, 2024

(65) Prior Publication Data

US 2024/0266773 A1 Aug. 8, 2024

(30) Foreign Application Priority Data

Feb. 8, 2023 (JP) ................................ 2023-017576

(51) Int. Cl.
*H01R 13/40* (2006.01)
*H01R 13/405* (2006.01)
*H01R 13/52* (2006.01)

(52) U.S. Cl.
CPC ....... *H01R 13/405* (2013.01); *H01R 13/5202* (2013.01)

(58) Field of Classification Search
CPC .............. H01R 13/405; H01R 13/5202; H01R 13/6272; H01R 13/631; H01R 2201/26; H01R 13/504; H01R 13/748; H01R 31/06; H01R 13/521; H01R 13/04; H01R 13/502; H01R 13/516; H01R 13/74
See application file for complete search history.

(56) References Cited

U.S. PATENT DOCUMENTS 7,568,932 B2 * 8/2009 O'Connor ............ H01R 13/533 439/271
2010/0297864 A1 * 11/2010 Matsuoka .............. H01R 43/24 439/271
2018/0261952 A1 * 9/2018 Suzuki ............... H01R 13/5227
2019/0173224 A1 * 6/2019 Inoue ................. H01R 13/5219
2020/0076116 A1 * 3/2020 Tanaka ............... H01R 13/5202
2020/0153154 A1 * 5/2020 Mamiya ............. H01R 13/5202
2020/0194930 A1 * 6/2020 Yamada ............. H01R 13/6215
2021/0194172 A1 * 6/2021 Hashimoto ........ H01R 13/5208
2022/0320762 A1 * 10/2022 Tachi ................... H01R 13/113
(Continued)

FOREIGN PATENT DOCUMENTS

JP 2000-040551 A 2/2000
JP 2013-157256 A 8/2013

*Primary Examiner* — Truc T Nguyen
(74) *Attorney, Agent, or Firm* — Venjuris, P.C.

(57) ABSTRACT

A housing of a relay connector includes a primary molded portion molded with a terminal as an insert and a secondary molded portion molded with the primary molded portion including the terminal as an insert. The primary molded portion includes a first body portion for holding the terminal and a tubular first connector fitting portion projecting in a first direction from an end surface in the first direction of the first body portion and provided in an internal space of an inserting portion. The secondary molded portion includes a second body portion for holding the terminal and covering the first body portion with the first body portion partially embedded and the inserting portion projecting in the first direction from an end surface in the first direction of the second body portion.

8 Claims, 6 Drawing Sheets

(56) References Cited

U.S. PATENT DOCUMENTS

| | | | | |
|---|---|---|---|---|
| 2023/0110901 A1* | 4/2023 | Sugiki | H01R 12/91 | |
| | | | 439/382 | |
| 2023/0115234 A1* | 4/2023 | Sugiki | H01R 12/724 | |
| | | | 439/247 | |
| 2024/0162645 A1* | 5/2024 | Fujisaki | H01R 13/504 | |

* cited by examiner

RELAY CONNECTOR

CROSS-REFERENCE TO RELATED APPLICATIONS

This application is based on and claims priority from Japanese Patent Application No. 2023-017576, filed on Feb. 8, 2023, with the Japan Patent Office, the disclosure of which is incorporated herein in its entirety by reference.

TECHNICAL FIELD

The present disclosure relates to a relay connector.

BACKGROUND

Conventionally, a relay connector mounted on a device case storing oil such as a transmission case is known as a connector for vehicle (see, for example, Japanese Patent Laid-open Publication Nos. 2013-157256 and 2000-040551). The relay connector is a connector for electrically connecting the inside and outside of the device case.

SUMMARY

If a part of the relay connector to be inserted into the device case becomes long, the relay connector easily interferes with other components provided inside the device case. Accordingly, it is required to shorten the part of the relay connector to be inserted into the device case.

The present disclosure aims to provide a relay connector enabling the shortening of a part to be inserted into a device case.

The present disclosure is directed to a relay connector to be mounted on a device case for electrically connecting inside and outside of the device case, the relay connector being provided with a housing including a tubular inserting portion to be inserted into a mounting hole of the device case, an electrically conductive terminal provided in a state partially embedded in the housing, and a sealing member to be mounted on an outer periphery of the inserting portion, the sealing member sealing between the mounting hole and the inserting portion, the housing including a primary molded portion molded with the terminal as an insert and a secondary molded portion molded with the primary molded portion including the terminal as an insert, the primary molded portion including a first body portion for holding the terminal and a tubular first connector fitting portion projecting in a first direction from an end surface in the first direction of the first body portion, the first connector fitting portion being provided in an internal space of the inserting portion, and the secondary molded portion including a second body portion for holding the terminal and covering the first body portion with the first body portion partially embedded, the inserting portion projecting in the first direction from an end surface in the first direction of the second body portion and a second connector fitting portion projecting in a first opposite direction from an end surface in the first opposite direction of the second body portion, the first opposite direction being opposite to the first direction.

According to the relay connector of the present disclosure, a part to be inserted into the device case can be shortened.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
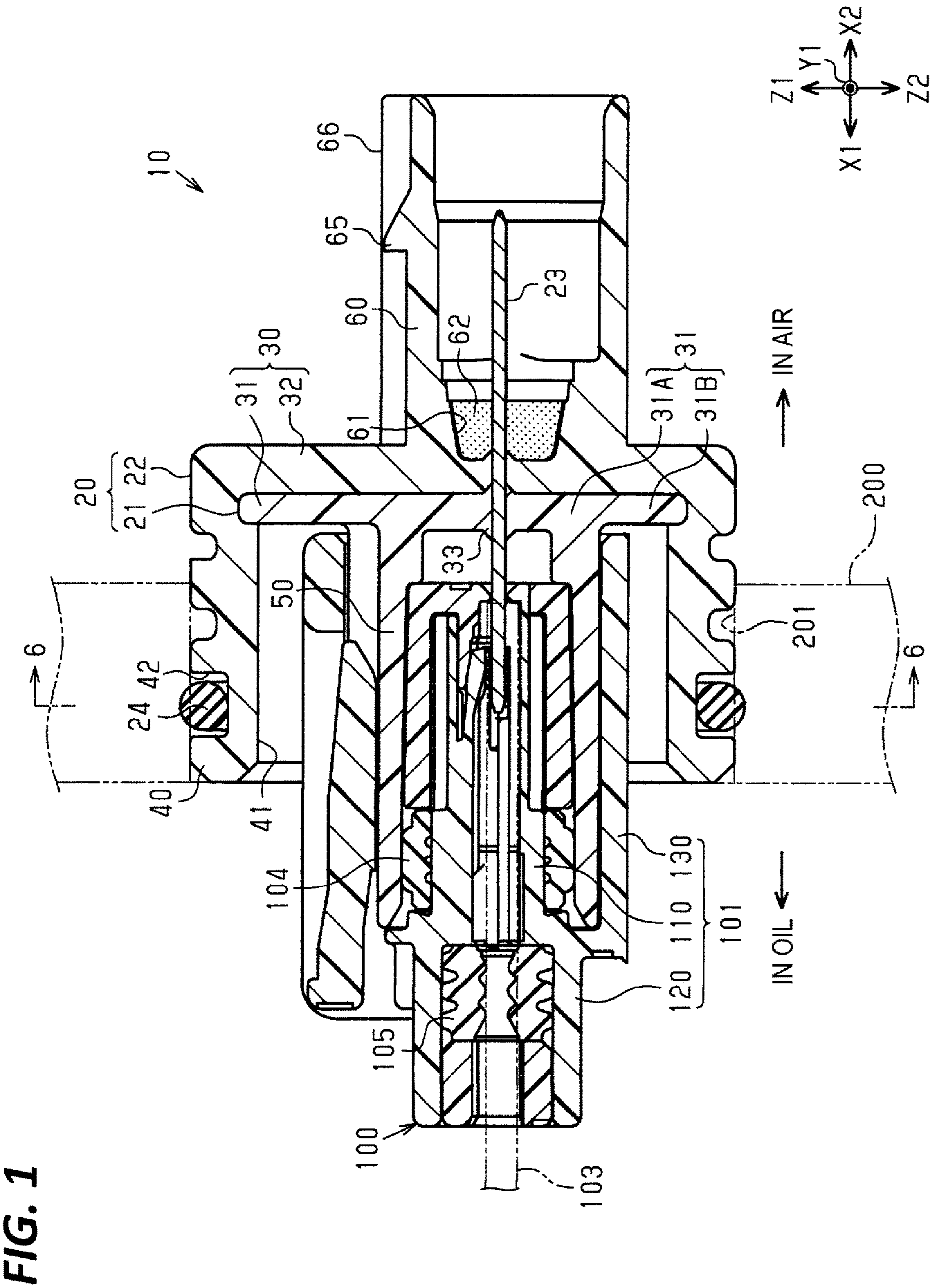
FIG. 1 is a schematic section (section along 1-1 in FIG. 4) showing a relay connector of one embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of Present Disclosure

First, embodiments of the present disclosure are listed and described.

[1] The relay connector of the present disclosure is to be mounted on a device case for electrically connecting inside and outside of the device case, and provided with a housing including a tubular inserting portion to be inserted into a mounting hole of the device case, an electrically conductive terminal provided in a state partially embedded in the housing, and a sealing member to be mounted on an outer periphery of the inserting portion, the sealing member sealing between the mounting hole and the inserting portion, the housing including a primary molded portion molded with the terminal as an insert and a secondary molded portion molded with the primary molded portion including the terminal as an insert, the primary molded portion including a first body portion for holding the terminal and a tubular first connector fitting portion projecting in a first direction from an end surface in the first direction of the first body portion, the first connector fitting portion being provided in an internal space of the inserting portion, and the secondary molded portion including a second body portion for holding the terminal and covering the first body portion with the first body portion partially embedded, the inserting portion projecting in the first direction from an end surface in the first direction of the second body portion and a second connector fitting portion projecting in a first opposite direction from an end surface in the first opposite direction of the second body portion, the first opposite direction being opposite to the first direction.

According to this configuration, the first connector fitting portion projects in the first direction, in which the inserting portion to be inserted into the mounting hole of the device case projects. Thus, the first connector fitting portion projects toward the inside of the device case. Further, at least a part of the first connector fitting portion is provided in the internal space of the inserting portion. That is, the first connector fitting portion is at least partially accommodated in the internal space of the inserting portion, i.e. at least partially embedded in the inserting portion. Thus, a length of the first connector fitting portion projecting in the first direction from the end surface in the first direction of the inserting portion can be shortened as compared to the case where a base end of the first connector fitting portion is connected to the end surface in the first direction of the inserting portion. That is, a length of the first connector fitting portion projecting in the first direction from the end surface in the first direction of the inserting portion can be shortened by as much as the first connector fitting portion is at least partially embedded in the inserting portion as compared to the case where the end surface in the first direction of the inserting portion becomes the bottom wall of the first connector fitting portion. In this way, the length of the part of the relay connector to be inserted into the device case can be suitably shortened. As a result, the interference of the relay connector with other components can be suitably suppressed inside the device case.

Further, the primary molded portion including the first connector fitting portion is formed separately from the secondary molded portion including the inserting portion. Thus, it can be suppressed that the shape of the primary molded portion such as the first connector fitting portion is restricted due to the shape of the secondary molded portion such as the inserting portion. In this way, a degree of freedom in the shape of the primary molded portion can be improved. Further, a degree of freedom in combining the shape of the primary molded portion and that of the secondary molded portion can be improved. As a result, a degree of freedom in the shape of the entire relay connector can be improved.

[2] Preferably in [1] described above, the first body portion includes a bottom wall portion for closing an opening in the first opposite direction of the first connector fitting portion and a flange portion formed continuously and integrally with the bottom wall portion, the flange portion projecting radially outwardly of the first connector fitting portion from an outer peripheral surface of the first connector fitting portion, and the second body portion covers a tip region of the flange portion with the tip region embedded.

According to this configuration, the first body portion and the second body portion are suitably integrated by embedding the tip region of the flange portion of the first body portion in the second body portion. In this way, the primary molded portion and the secondary molded portion can be suitably integrated.

[3] Preferably in [2] described above, an end part in the first direction of the first connector fitting portion projects in the first direction from an end surface in the first direction of the inserting portion, an inner peripheral surface of the inserting portion surrounds the outer peripheral surface of the first connector fitting portion with a gap provided between the outer peripheral surface of the first connector fitting portion and the inner peripheral surface of the inserting portion, and a part not covered by the second body portion, out of an end surface in the first direction of the flange portion, is exposed in the gap.

According to this configuration, the gap is provided between the inner peripheral surface of the inserting portion and the outer peripheral surface of the first connector fitting portion. Thus, a mating housing of a mating connector fit into the first connector fitting portion can be suitably inserted into the gap. In this way, the mating connector can be accommodated in the internal space of the inserting portion.

[4] Preferably in [2] or [3] described above, the second body portion covers in close contact with an entire end surface in the first opposite direction of the first body portion, the first connector fitting portion surrounds an outer periphery of the terminal projecting in the first direction from the end surface in the first direction of the first body portion, and the second connector fitting portion surrounds the outer periphery of the terminal projecting in the first opposite direction from the end surface in the first opposite direction of the second body portion.

According to this configuration, the entire end surface in the first opposite direction of the first body portion is covered by the second body portion while being held in close contact with the second body portion. In this way, a close contact area of the first body portion and the second body portion can be increased and adhesion between the first body portion and the second body portion can be improved.

[5] Preferably in any one of [1] to [4] described above, the primary molded portion includes one or more projecting portions projecting radially outwardly of the first connector fitting portion from the outer peripheral surface of the first connector fitting portion and to be engaged with the mating housing of the mating connector fit in the first connector fitting portion in a circumferential direction of the first connector fitting portion.

According to this configuration, if the mating connector is fit into the first connector fitting portion, the projecting portion(s) of the primary molded portion and the mating housing of the mating connector are engaged with each other in the circumferential direction of the first connector fitting portion. In this way, the first connector fitting portion can be suitably suppressed from relatively rotating about an axis extending in the first direction with respect to the mating housing. As a result, the terminal of the relay connector can be suppressed from relatively moving with respect to a mating terminal of the mating connector and the wear of a contact point of the terminal and the mating terminal can be suitably suppressed.

[6] Preferably in [5] described above, the first connector fitting portion is formed into a rectangular tube shape, the first connector fitting portion includes a first peripheral wall provided in a second direction orthogonal to the first direction, a second peripheral wall provided in a second opposite direction, the second opposite direction being opposite to the second direction, a third peripheral wall provided in a third direction orthogonal to both the first direction and the second direction, and a fourth peripheral wall provided in a third opposite direction, the third opposite direction being opposite to the third direction, and the projecting portions include a plurality of first projecting portions provided on the third peripheral wall and one second projecting portion provided on the fourth peripheral wall.

According to this configuration, the first projecting portions and the second projecting portion configured to be different from each other are respectively provided on the third peripheral wall provided in the third direction and the fourth peripheral wall provided in the third opposite direction. Thus, the mating housing of the mating connector can be suppressed from being fit in a wrong posture into the first connector fitting portion. For example, if the mating housing includes a first groove, into which the first projecting portions are inserted along the first direction, and a second groove, into which the second projecting portion is inserted along the first direction, the mating connector can be suppressed from being fit in a wrong posture into the first connector fitting portion. In this way, erroneous assembling can be suitably suppressed in assembling the mating housing with the first connector fitting portion.

[7] Preferably in any one of [1] to [6] described above, the primary molded portion includes an engaging projection projecting radially outwardly of the first connector fitting portion from the outer of the first connector fitting portion, the engaging projection extends along the first direction, and the engaging projection is formed to increase a projection amount from the outer peripheral surface of the first connector fitting portion along the first opposite direction from an end part in the first direction of the engaging projection.

According to this configuration, the mating connector can be easily fixed to the first connector fitting portion by providing the engaging portion to be engaged with the engaging projection in the mating connector to be fit into the first connector fitting portion.

[8] Preferably in any one of [1] to [7] described above, the first connector fitting portion has a tubular shape formed by a peripheral wall continuous over an entire periphery of the first connector fitting portion in a circumferential direction, and the first connector fitting portion is formed to have a waterproof structure so that a mating connector is fit, the mating connector being a waterproof connector.

According to this configuration, even if the inside of the device case is an oil environment, the intrusion of a liquid such as oil into the first connector fitting portion having the mating connector fit therein can be suitably suppressed.

Details of Embodiment of Present Disclosure

A specific example of a relay connector of the present disclosure is described below with reference to the drawings. For the convenience of description, some components may be shown in an exaggerated or simplified manner in each drawing. Further, a dimension ratio of each part may be different in each figure. "Parallel" and "orthogonal" in this specification mean not only strictly parallel and orthogonal, but also substantially parallel and orthogonal within a range in which functions and effects in this embodiment are achieved. A term "tubular" used in the description of this specification indicates not only a shape formed by a peripheral wall continuous over an entire periphery in a circumferential direction, but also a shape formed by combining a plurality of components and a shape having a cut or the like in a circumferential part such as a C shape. Note that the "tubular" shapes include circular shapes, elliptical shapes and polygonal shapes with angular or rounded corners, but there is no limitation to these. Note that the present invention is not limited to these illustrations, but is represented by claims and intended to include all changes in the scope of claims and in the meaning and scope of equivalents.

(Overall Configuration)

As shown in FIG. 1, a relay connector 10 is mounted on a device case 200 installed in a vehicle. The relay connector 10 is fixed to the device case 200, for example, by bolts or the like. The relay connector 10 is a connector for electrically connecting the inside and outside of the device case 200. The device case 200 is, for example, a transmission case. The device case 200 is, for example, made of metal. The inside of the device case 200 is an oil environment and the outside of the device case 200 is an air environment. An electrical component such as a motor or sensor is provided inside the device case 200. The device case 200 includes a mounting hole 201, through which the relay connector 10 is passed. The mounting hole 201 is formed to allow the inside and outside of the device case 200 to communicate. The relay connector 10 is fit into the mounting hole 201 of the device case 200. The relay connector 10 is electrically connected to a mating connector 100 inside the device case 200. The relay connector 10 is electrically connected to the electrical component provided inside the device case 200 via the mating connector 100. Although not shown, the relay connector 10 is, for example, electrically connected to a mating connector provided in a control unit accommodating a control circuit and the like outside the device case 200. The control circuit provided in the control unit is electrically connected to the electrical component provided inside the device case 200 via the relay connector 10 and the mating connector 100.

(Configuration of Relay Connector 10)

The relay connector 10 is, for example, mountable on the device case 200 in an arbitration orientation according to the posture of the device case 200. The relay connector 10 is, for example, inserted into the mounting hole 201 of the device case 200 along a first direction X1.

Figure 3:
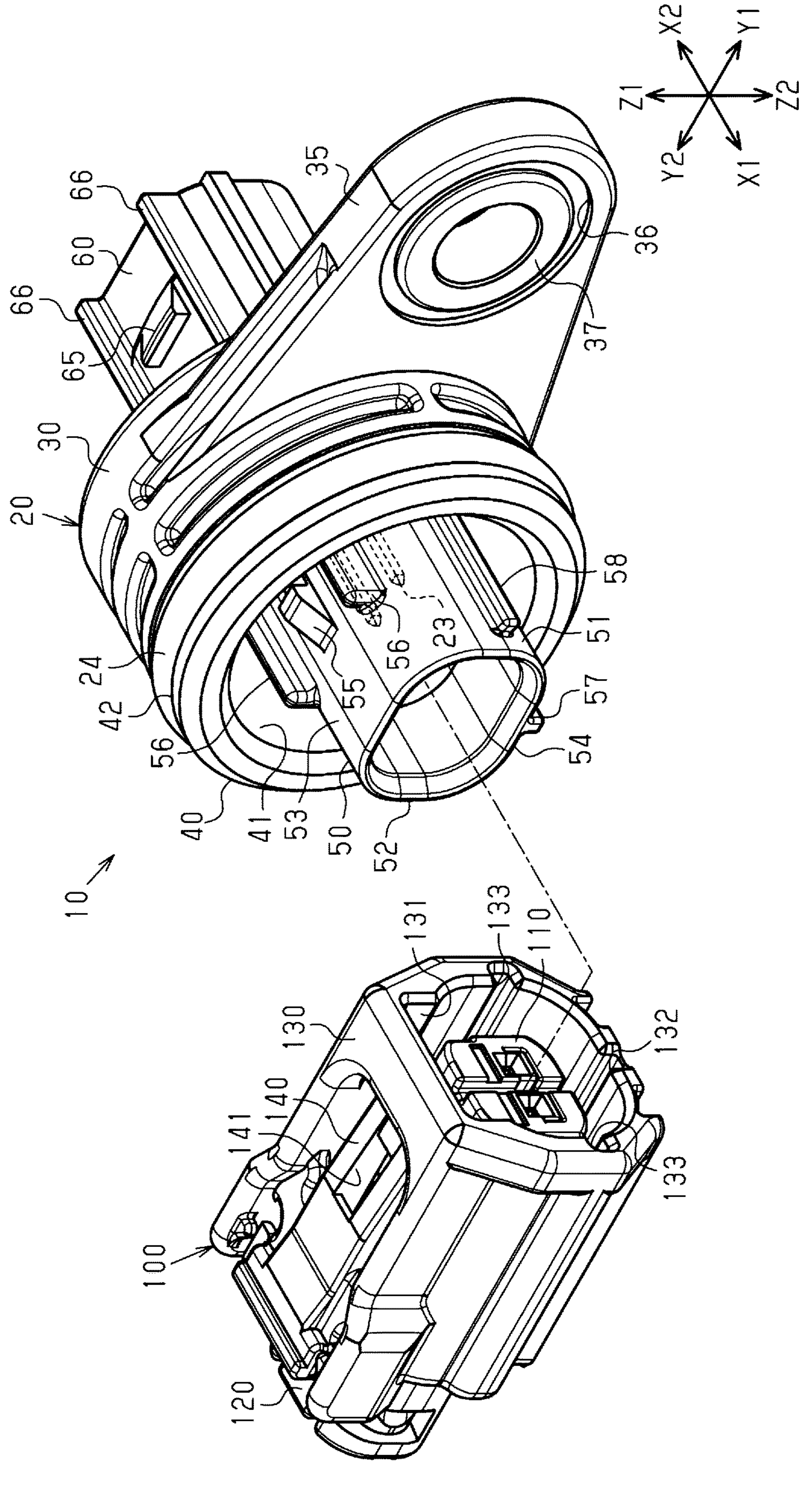
FIG. 3 is a schematic perspective view showing the relay connector of the embodiment.

In the following description, an opposite direction of the first direction X1 is referred to as a first opposite direction in describing a positional relationship of each constituent element of the relay connector 10. Further, out of directions orthogonal to the first direction X1, a rightward direction in FIG. 3 is referred to as a second direction Y1, and an opposite direction of the second direction Y1 is referred to as a second opposite direction Y2. Out of directions orthogonal to both the first direction X1 and the second direction Y1, an upward direction in FIG. 3 is referred to as a third direction Z1, and an opposite direction of the third direction Z1 is referred to as a third opposite direction Z2. Note that the description of directions in the mating connector 100 are based on a state where the mating connector 100 is assembled with the relay connector 10.

As shown in FIGS. 1 to 4, the relay connector 10 is provided with a housing 20, one or more electrically conductive terminals 23 held in the housing 20 and a sealing member 24 mounted on the outer periphery of the housing 20. The relay connector 10 of this embodiment is provided with two terminals 23.

Figure 2:
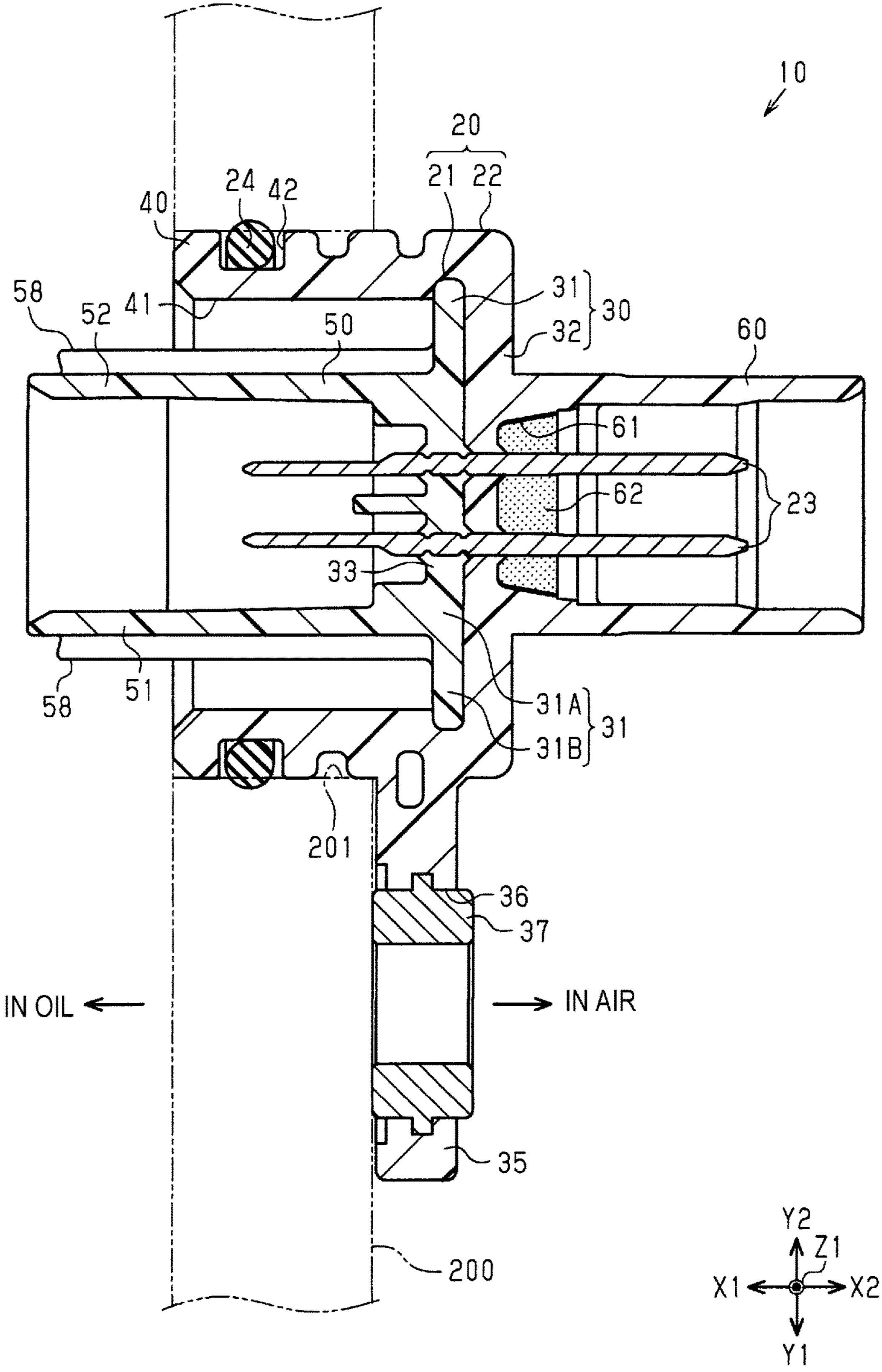
FIG. 2 is a schematic section (section along 2-2 in FIG. 4) showing the relay connector of the embodiment.

As shown in FIGS. 1 and 2, the housing 20 includes, for example, a primary molded portion 21 and a secondary molded portion 22. The primary molded portion 21 is, for example, formed by insert molding with the plurality of terminals 23 as inserts. The primary molded portion 21 is formed to cover a part of each terminal 23. The primary molded portion 21 is formed to cover an intermediate part of each terminal 23 in a length direction. The secondary molded portion 22 is formed by insert molding with the primary molded portion 21 including the terminals 23 as an insert. The secondary molded portion 22 is formed to cover a part of the primary molded portion 21. Each of the primary molded portion 21 and the secondary molded portion 22 is, for example, made of a material such as a synthetic resin. Polyolefin, polyamide, polyester and polybutylene terephthalate can be, for example, used as a material of each of the primary molded portion 21 and the secondary molded portion 22. The material of the primary molded portion 21 and that of the secondary molded portion 21 may be the same kind of material or may be mutually different materials.

As shown in FIGS. 2 and 3, the housing 20 includes a body portion 30, a tubular inserting portion 40 projecting in the first direction X1 from the body portion 30 and a tubular first connector fitting portion 50 provided in an internal space of the inserting portion 40. The housing 20 includes a tubular second connector fitting portion 60 projecting in the first opposite direction X2 from the body portion 30.

(Configuration of Body Portion 30)

As shown in FIG. 2, the body portion 30 is provided in an outside space of the device case 200 when the inserting portion 40 is fit into the mounting hole 201. The body portion 30 is, for example, formed to close an opening in the first opposite direction X2 of the inserting portion 40. The body portion 30 is, for example, formed to close an opening in the first opposite direction X2 of the first connector fitting portion 50. The body portion 30 is, for example, formed to close an opening in the first direction X1 of the second connector fitting portion 60.

The body portion 30 includes a terminal holding portion 33 for holding the plurality of terminals 23. Here, each terminal 23 is, for example, formed into a bar shape. Each terminal 23 extends, for example, straight along the first direction X1. Each terminal 23 is, for example, made of metal. For example, the terminal holding portion 33 covers in close contact with the outer peripheral surface of each terminal 23 over an entire periphery in a circumferential direction. The terminal holding portion 33 holds each terminal 23, for example, with an intermediate part of each terminal 23 in an axial direction embedded. In other words, a part of each terminal 23 is embedded in the housing 20. For example, each terminal 23 projects in the first direction X1 from an end surface in the first direction X1 of the terminal holding portion 33 and projects in the first opposite direction X2 from an end surface in the first opposite direction X2 of the terminal holding portion 33.

The body portion 30 includes, for example, a fixing portion 35 projecting radially outwardly of the inserting portion 40 from the outer peripheral surface of the inserting portion 40. The fixing portion 35 projects, for example, in a direction (here, the second direction Y1) orthogonal to an insertion direction (here, the first direction X1) of the inserting portion 40 into the mounting hole 201. The fixing portion 35 is formed into a plate shape. The fixing portion 35 is provided to be able to contact the outer surface of the device case 200. The fixing portion 35 is, for example, formed to be engageable with the outer surface of the device case 200 in the first direction X1. The fixing portion 35 includes, for example, a through hole 36 penetrating through the fixing portion 35 in a plate thickness direction (here, the first direction X1). A collar 37 made of metal is, for example, inserted into the through hole 36. The collar 37 is, for example, formed into a hollow cylindrical shape. An unillustrated fixing bolt is inserted into a hole of the collar 37. The body portion 30 is fixed to the device case 200 by tightening the bolt inserted into the hole of the collar 37.

(Configuration of Inserting Portion 40)

The inserting portion 40 projects, for example, in the first direction X1 from an end surface in the first direction X1 of the body portion 30. The inserting portion 40 is, for example, open in the first direction X1. The inserting portion 40 is inserted into the mounting hole 201 of the device case 200. The inserting portion 40 is inserted into the mounting hole 201 along the first direction X1. The outer peripheral surface of the inserting portion 40 is, for example, formed into a shape corresponding to an inner peripheral surface defining the mounting hole 201. As shown in FIG. 3, the inserting portion 40 of this embodiment is formed into a hollow cylindrical shape having circular inner peripheral shape and outer peripheral shape. The inserting portion 40 is, for example, formed into a tubular shape formed by a peripheral wall continuous over an entire periphery in the circumferential direction, i.e. formed into an endless structure in which a start point and an end point match. In other words, the inserting portion 40 is not formed with any hole for allowing the inside and outside of the inserting portion 40 to communicate such as a slit in a circumferential part.

The inserting portion 40 surrounds, for example, the outer periphery of a part in the axial direction (here, the first direction X1) of the first connector fitting portion 50. The inserting portion 40 surrounds, for example, the outer periphery of an end part in the first opposite direction X2 of the first connector fitting portion 50. The inner peripheral surface of the inserting portion 40 is provided away from the outer peripheral surface of the first connector fitting portion 50. That is, the inner peripheral surface of the inserting portion 40 surrounds the outer peripheral surface of the first connector fitting portion 50 with a gap 41 provided between the outer peripheral surface of the first connector fitting portion 50 and the inner peripheral surface of the inserting portion 40. The gap 41 is continuously formed over the entire periphery of the inserting portion 40 in the circumferential direction.

As shown in FIG. 2, an accommodation groove 42 for accommodating the sealing member 24 is, for example, formed in the outer peripheral surface of the inserting portion 40. The accommodation groove 42 is formed to be recessed radially inwardly of the inserting portion 40 from the outer peripheral surface of the inserting portion 40. The accommodation groove 42 is, for example, formed over the entire periphery of the outer peripheral surface of the inserting portion 40 in the circumferential direction. The tubular sealing member 24 is fit into the accommodation groove 42. When the inserting portion 40 is fit into the mounting hole 201, the sealing member 24 is held in close contact with the inner peripheral surface defining the mounting hole 201 over the entire periphery in the circumferential direction and seals between the outer peripheral surface of the housing 20 and the inner peripheral surface of the device case 200.

(Configuration of Sealing Member 24)

The sealing member 24 is configured to be resiliently deformable. The sealing member 24 is, for example, formed into a tubular shape continuous over the entire periphery of the inserting portion 40 in the circumferential direction, i.e. formed into an endless structure in which a start point and an end point match. The sealing member 24 is, for example, an O-ring. The inner peripheral shape of the sealing member 24 is, for example, formed into a shape along the outer peripheral surface of the inserting portion 40. The outer peripheral shape of the sealing member 24 is, for example, formed into a shape along the inner peripheral surface defining the mounting hole 201. The sealing member 24 of this embodiment is formed into a hollow cylindrical shape having circular inner peripheral shape and outer peripheral shape. The sealing member 24 is, for example, made of rubber.

(Configuration of First Connector Fitting Portion 50)

As shown in FIG. 1, the mating connector 100 is fit into the first connector fitting portion 50. The mating connector 100 of this embodiment is a waterproof connector. The first connector fitting portion 50 of this embodiment is formed to have a waterproof structure. That is, the first connector fitting portion 50 is structured to prevent the intrusion of a liquid such as oil into the first connector fitting portion 50 from the outside of the first connector fitting portion 50 with the mating connector 100 fit in the first connector fitting portion 50.

The first connector fitting portion 50 projects, for example, in the first direction X1 from the end surface in the first direction X1 of the body portion 30. The first connector fitting portion 50 is, for example, open in the first direction X1. An end part in the first direction X1 of the first connector fitting portion 50 projects, for example, in the first direction X1 from an end surface in the first direction X1 of the inserting portion 40. The first connector fitting portion 50 surrounds, for example, the outer peripheries of the terminals 23 projecting from the end surface in the first direction X1 of the terminal holding portion 33. The inner peripheral surface of the first connector fitting portion 50 is provided away from the terminals 23. The inner peripheral surface of the first connector fitting portion 50 surrounds, for example, the outer peripheries of the terminals 23 entirely in the circumferential direction while being separated from the terminals 23.

As shown in FIG. 3, the first connector fitting portion 50 is, for example, formed into a tubular shape continuous over the entire periphery of the first connector fitting portion 50 in the circumferential direction, i.e. formed into an endless structure in which a start point and an end point match. In other words, the first connector fitting portion 50 is not formed with any hole for allowing the inside and outside of the first connector fitting portion 50 to communicate such as a slit in a circumferential part. The first connector fitting portion 50 is, for example, formed into a rectangular tube shape. The first connector fitting portion 50 of this embodiment is formed such that the inner peripheral shape and the outer peripheral shape thereof are a rectangular shape with rounded corners.

The first connector fitting portion 50 includes, for example, a first peripheral wall 51 provided in the second direction Y1, a second peripheral wall 52 provided in the second opposite direction Y1, a third peripheral wall 53 provided in the third direction Z1 and a fourth peripheral wall 54 provided in the third opposite direction Z2.

An engaging projection 55 projecting radially outwardly of the first connector fitting portion 50 from the outer peripheral surface of the first connector fitting portion 50 is, for example, provided on the outer peripheral surface of the first connector fitting portion 50. The engaging projection 55 is, for example, provided on the outer peripheral surface of the third peripheral wall 53. The engaging portion 55 is, for example, provided on the outer peripheral surface of an intermediate part in the axial direction of the first connector fitting portion 50. The engaging projection 55 extends, for example, along the first direction X1. The engaging projection 55 is, for example, formed to increase a projection amount from the outer peripheral surface of the first connector fitting portion 50 along the first opposite direction X2 from an end part in the first direction X1 of the engaging projection 55. The engaging projection 55 is, for example, formed to be engageable with an engaging portion 140 provided in the mating connector 100.

Projecting portions 56, 57 and 58 projecting radially outwardly of the first connector fitting portion 50 from the outer peripheral surface of the first connector fitting portion 50 are, for example, provided on the outer peripheral surface of the first connector fitting portion 50. The first connector fitting portion 50 of this embodiment includes two projecting portions 56, one projecting portion 57 and two projecting portions 58.

Figure 5:
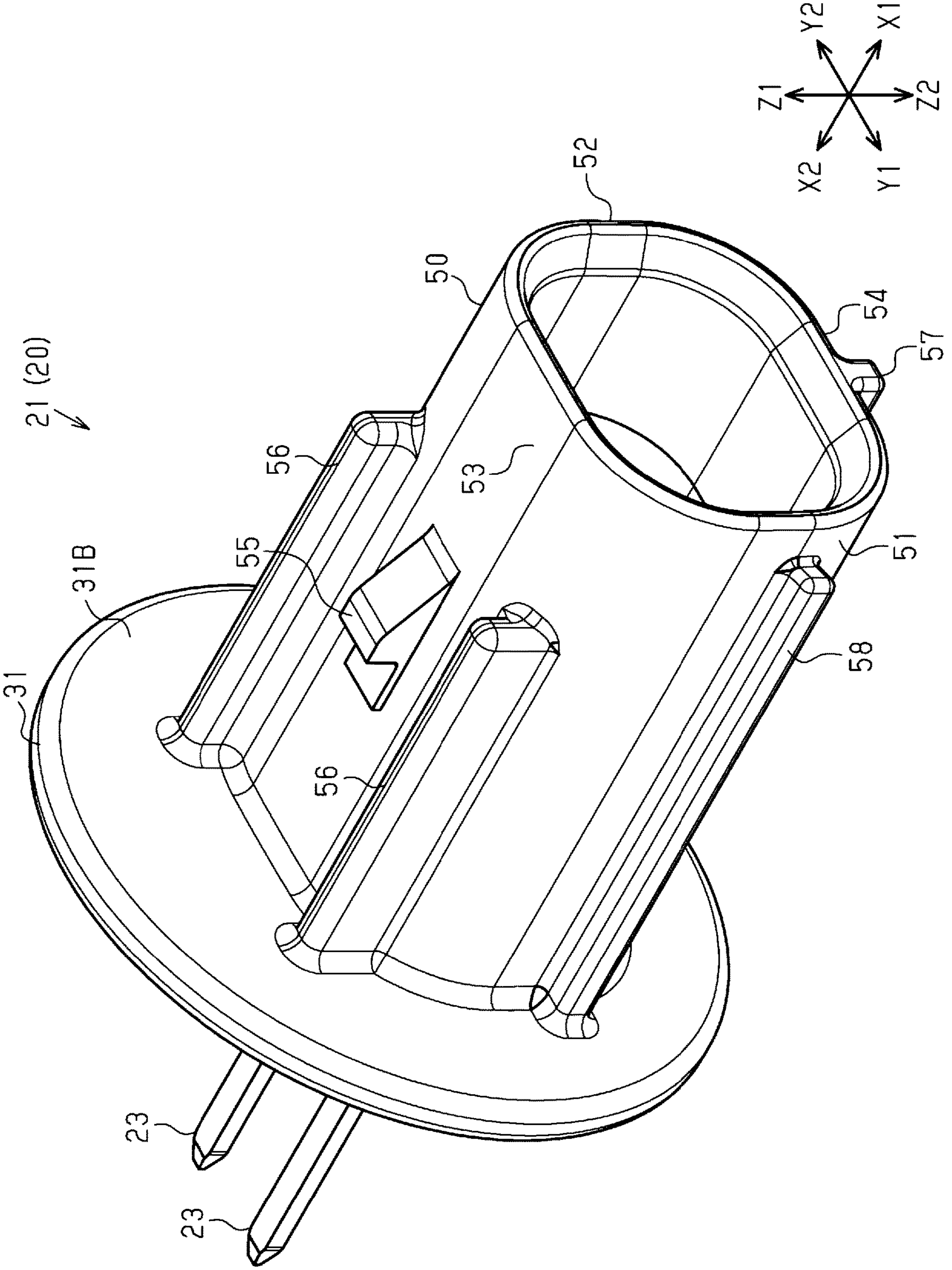
FIG. 5 is a schematic perspective view showing a primary molded portion of the embodiment.

As shown in FIG. 5, the two projecting portions 56 are, for example, provided on the outer peripheral surface of the third peripheral wall 53. The two projecting portions 56 are, for example, provided to sandwich the engaging projection 55 from both sides in the second direction Y1. Each projecting portion 56 extends, for example, along the first direction X1 from an end part in the axial direction, here from an end part in the first opposite direction X2, of the first connector fitting portion 50. Each projecting portion 56 extends, for example, from the end part in the first opposite direction X2 of the first connector fitting portion 50 to an intermediate part in the axial direction of the first connector fitting portion 50.

Figure 4:
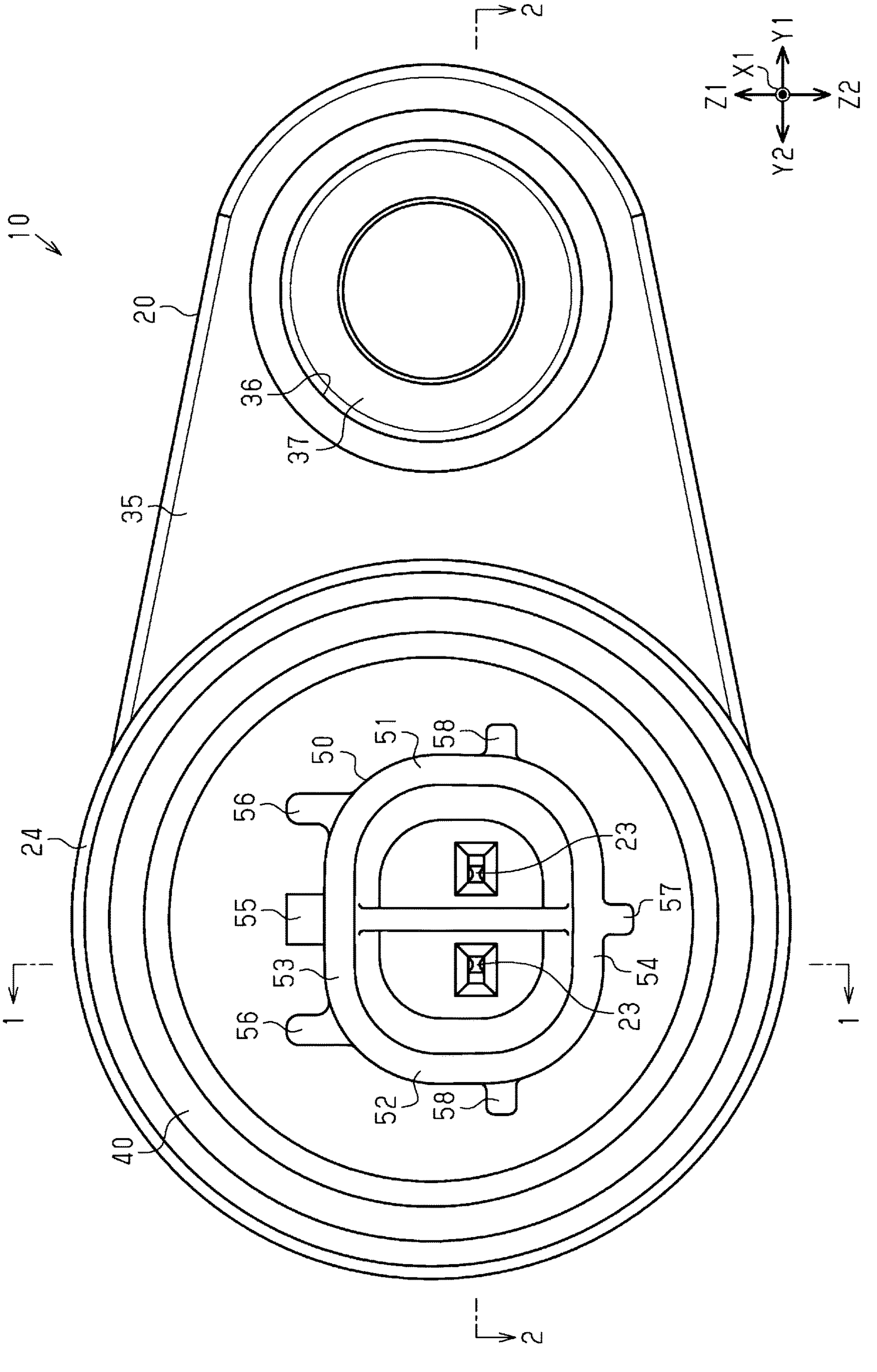
FIG. 4 is a schematic plan view showing the relay connector of the embodiment.

The one projecting portion 57 is, for example, provided on the outer peripheral surface of the peripheral wall 54. The projecting portion 57 is provided at a position shifted from the engaging projection 55 by 180° in the circumferential direction of the first connector fitting portion 50. As shown in FIG. 4, one of the two projecting portions 58 is, for example, provided on each of the outer peripheral surface of the first peripheral wall 51 and the outer peripheral surface of the second peripheral wall 52. As shown in FIG. 5, each projecting portion 57, 58 extends, for example, along the first direction X1 from the end part in the axial direction, here from the end part in the first opposite direction X2, of the first connector fitting portion 50. A length of each projecting portion 57, 58 along the first direction X1 is, for example, larger than that of each projecting portion 56 along the first direction X1.

(Configuration of Second Connector Fitting Portion 60)

As shown in FIG. 1, the second connector fitting portion 60 projects, for example, in the first opposite direction X2 from an end surface in the first opposite direction X2 of the body portion 30. The second connector fitting portion 60 is provided in the outside space of the device case 200. An unillustrated connector to be electrically connected to the control unit provided outside the device case 200 is fit into the second connector fitting portion 60.

The second connector fitting portion 60 is, for example, open in the first opposite direction X2. The second connector fitting portion 60 surrounds, for example, the outer peripheries of the terminals 23 projecting from the end surface in the first opposite direction X2 of the terminal holding portion 33. The inner periphery surface of the second connector fitting portion 60 is provided away from the terminals 23. The inner peripheral surface of the second connector fitting portion 60 surrounds, for example, the outer peripheries of the terminals 23 entirely in the circumferential direction while being separated from the terminals 23.

The second connector fitting portion 60 is, for example, formed into a tubular shape continuous over the entire periphery of the second connector fitting portion 60 in the circumferential direction, i.e. formed into an endless structure in which a start point and an end point match. The second connector fitting portion 60 of this embodiment is formed such that the inner peripheral shape and the outer peripheral shape thereof are a rectangular shape with rounded corners.

A recess 61 is provided in a bottom surface in the first direction X1 of the second connector fitting portion 60. A potting material 62 is filled in the recess 61. The potting material 62 seals between the housing 20 and the terminals 23 in a liquid-tight manner. The potting material 62 suppresses, for example, the leakage of oil or the like inside the device case 200 to the outside of the device case 200.

An engaging projection 65 projecting radially outwardly of the second connector fitting portion 60 from the outer peripheral surface of the second connector fitting portion 60 is, for example, provided on the outer peripheral surface of the second connector fitting portion 60. The engaging projection 65 is, for example, provided on the outer peripheral surface of an intermediate part in the axial direction of the second connector fitting portion 60. The engaging projection 65 extends, for example, along the third direction Z1 from the outer peripheral surface of a peripheral wall in the third direction Z1, out of the second connector fitting portion 60. The engaging projection 65 is, for example, formed to increase a projection amount from the outer peripheral surface of the second connector fitting portion 60 along the first direction X1 from an end part in the first opposite direction X2 of the engaging projection 65. The engaging projection 65 is, for example, formed to be engageable with an engaging portion provided in the unillustrated mating connector.

As shown in FIG. 3, one or more projecting portions 66 projecting radially outwardly of the second connector fitting portion 60 from the outer peripheral surface of the second connector fitting portion 60 are, for example, provided on the outer peripheral surface of the second connector fitting portion 60. Each projecting portion 66 extends, for example, along the first direction X1.

As shown in FIG. 5, the primary molded portion 21 constituting the housing 20 includes, for example, a first body portion 31, the first connector fitting portion 50, the engaging projection 55 and the projecting portions 56, 57 and 58. The primary molded portion 21 is, for example, formed such that the first body portion 31, the first connector fitting portion 50, the engaging projection 55 and the projecting portions 56, 57 and 58 are continuously integrated. The primary molded portion 21 is a component serving as a core in molding the secondary molded portion 22.

As shown in FIG. 2, the first body portion 31 forms a part of the body portion 30. The first body portion 31 includes, for example, a bottom wall portion 31A for closing an opening in the first opposite direction X2 of the first connector fitting portion 50 and a flange portion 31B formed continuously and integrally with the bottom wall portion 31A. The bottom wall portion 31A forms a part of the terminal holding portion 33. The flange portion 31B is formed to project radially outwardly of the first connector fitting portion 50 from the outer peripheral surface of the first connector fitting portion 50. The flange portion 31B is, for example, continuously formed over the entire periphery of the first connector fitting portion 50 in the circumferential direction. The first body portion 31 is, for example, formed into a disk shape as a whole. The first connector fitting portion 50 projects in the first direction X1 from an end surface in the first direction X1 of the first body portion 31. The first connector fitting portion 50 projects in the first direction X1 from an end surface in the first direction X1 of the bottom wall portion 31A.

As shown in FIG. 1, the secondary molded portion 22 constituting the housing 20 includes, for example, a second body portion 32, the inserting portion 40, the second connector fitting portion 60, the engaging projection 65 and the projecting portions 66. The secondary molded portion 22 is, for example, formed such that the second body portion 32, the inserting portion 40, the second connector fitting portion 60, the engaging projection 65 and the projecting portions 66 are continuously integrated.

The second body portion 32 forms a part of the body portion 30. In other words, the body portion 30 is composed of the first and second body portions 31, 32. The second body portion 32 covers a part of the first body portion 31 in an embedded state. That is, the second body portion 32 covers the first body portion 32 with a part of the first body portion 31 embedded in the second body portion 32. The second body portion 32 covers, for example, a tip region (i.e. outer edge region) of the flange portion 31B in an embedded state. For example, the second body portion 32 covers in close contact with the entire end surface in the first opposite direction X2 of the bottom wall portion 31A. That is, the second body portion 32 covers in close contact with the entire end surface in the first opposite direction X2 of the bottom wall portion 31A and covers in close contact with the entire end surface in the first opposite direction X2 of the flange portion 31B. A part of the second body portion 32 covering the end surface in the first opposite direction X2 of the bottom wall portion 31A forms a part of the terminal holding portion 33. Here, a part not covered by the second body portion 32, out of the end surface in the first direction X1 of the flange portion 31B, is exposed in the gap 41 between the outer peripheral surface of the first connector fitting portion 50 and the inner peripheral surface of the inserting portion 40.

As shown in FIG. 2, the second body portion 32 includes the fixing portion 35. The inserting portion 40 projects in the first direction X1 from an end surface in the first direction X1 of the second body portion 32. The inserting portion 40 projects in the first direction X1 from the end surface in the first direction X1 of the second body portion 32 in a part covering the tip region of the flange portion 31B. The second connector fitting portion 60 projects in the first opposite direction X2 from an end surface in the first opposite direction X2 of the second body portion 32. The second connector fitting portion 60 projects in the first opposite direction X2 from the end surface in the first opposite direction X2 of the second body portion 32 in a part covering the end surface in the first opposite direction X2 of the bottom wall portion 31A.

(Configuration of Mating Connector 100)

As shown in FIG. 1, the mating connector 100 is provided with a mating housing 101, mating terminals 103 held in the mating housing 101, a sealing member 104 and a sealing member 105. Although not shown, the mating terminal 103 includes, for example, a female terminal to be electrically connected to the terminal 23, which is a male terminal, and a wire connected to that female terminal. The mating connector 100 is a female connector.

The mating housing 101 includes an inserting tube portion 110 to be inserted into the first connector fitting portion 50 of the relay connector 10, a projecting tube portion 120 projecting in the first direction X1 from the inserting tube portion 110, and a tubular receptacle 130 surrounding the outer periphery of the inserting tube portion 110.

The inserting tube portion 110 is inserted into the first connector fitting portion 50 while accommodating the mating terminals 103 inside. The annular sealing member 104 is mounted on the outer peripheral surface of the inserting tube portion 110. The sealing member 104 is in close contact with the outer peripheral surface of the inserting tube portion 110 over an entire periphery in the circumferential direction. Further, the sealing member 104 is in close contact with the inner peripheral surface of the first connector fitting portion 50 over an entire periphery in the circumferential direction when the inserting tube portion 110 is fit into the first connector fitting portion 50. The sealing member 104 seals between the outer peripheral surface of the inserting tube portion 110 and the inner peripheral surface of the first connector fitting portion 50. In this way, the intrusion of a liquid such as oil into the first connector fitting portion 50 through a gap between the inserting tube portion 110 and the first connector fitting portion 50 can be suppressed. The sealing member 104 is, for example, made of rubber.

The projecting tube portion 120 is, for example, provided outside the first connector fitting portion 50. The sealing member 105 is provided inside the projecting tube portion 120. The sealing member 105 is in close contact with the outer peripheral surfaces of the mating terminals 103 over entire peripheries in the circumferential direction and in close contact with the inner peripheral surface of the projecting tube portion 120 over an entire periphery in the circumferential direction. The sealing member 105 seals between the outer peripheral surfaces of the mating terminals 103 and the inner peripheral surface of the projecting tube portion 120. In this way, the intrusion of a liquid such as oil into the inserting tube portion 110 and the first connector fitting portion 50 through a gap between the mating terminals 103 and the projecting tube portion 120 can be suppressed. The sealing member 105 is, for example, made of rubber.

The receptacle 130 is, for example, fit outside the first connector fitting portion 50. The receptacle 130 is inserted into the gap 41 between the outer peripheral surface of the first connector fitting portion 50 and the inner peripheral surface of the inserting portion 40.

As shown in FIG. 3, the receptacle 130 includes, for example, the engaging portion 140 formed to be engageable with the engaging projection 55 of the relay connector 10. The engaging portion 140 is, for example, formed into a frame body including an engaging hole 141 engageable with the engaging projection 55. The engaging portion 140 is, for example, configured to be resiliently deformable. The engaging portion 140 is, for example, configured to be deflectable in the third direction Z1 due to resilient deformation. The engaging portion 140 and the engaging projection 55 are, for example, engaged with each other by snap fitting utilizing the resilient deformation of the engaging portion 140.

Figure 6:
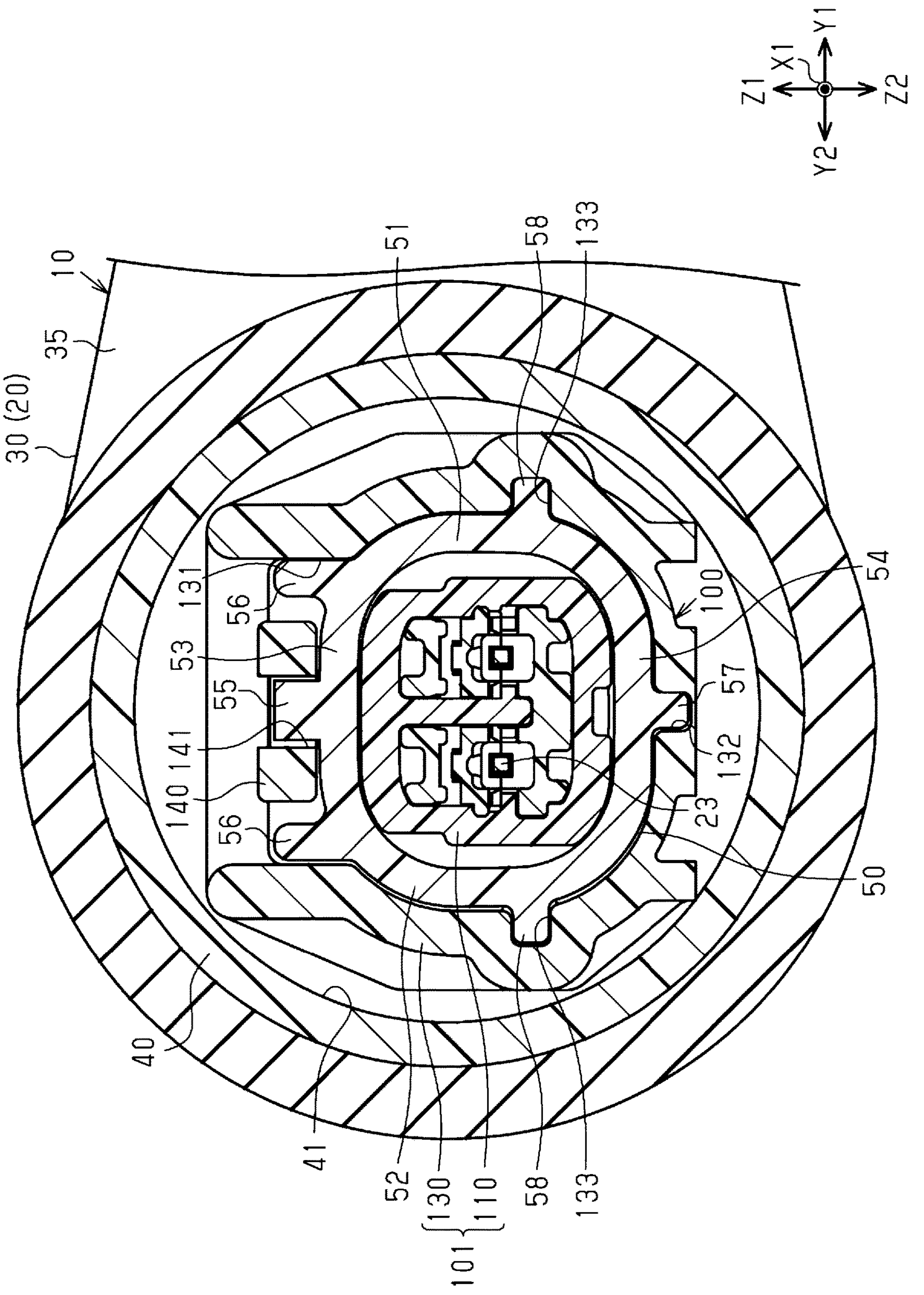
FIG. 6 is a schematic section (section along 6-6 in FIG. 1) showing the relay connector of the embodiment.

As shown in FIG. 6, the inner peripheral surface of the tubular receptacle 130 is formed with a first groove 131, into which the two projecting portions 56 are inserted, a second groove 132, into which the one projecting portion 57 is inserted, and two third grooves 133, into which the two projecting portions 58 are respectively inserted.

The first groove 131 extends, for example, in the first direction X1. The two projecting portions 56 are, for example, inserted into the first groove 131 along the first direction X1. The engaging portion 140 is provided inside the first groove 131. In the case of inserting the projecting portion 57 into the first groove 131, the projecting portion 57 contacts the engaging portion 140. Thus, the first groove 131 is formed such that the projecting portion 57 cannot be inserted.

The second groove 132 extends, for example, along the first direction X1. The one projecting portion 57 is, for example, inserted into the second groove 132 along the first direction X1. The second groove 132 is formed such that the projecting portions 56 cannot be inserted.

Each third groove 133 extends, for example, along the first direction X1. Each projecting portion 58 is, for example, inserted into each third groove 133 along the first direction X1.

The first, second and third grooves 131, 132 and 133 function as guide members in fitting the mating connector 100 into the first connector fitting portion 50. Similarly, the projecting portions 56, 57 and 58 function as guide members in fitting the mating connector 100 into the first connector fitting portion 50.

If the mating connector 100 is fit in a correct posture into the first connector fitting portion 50, the respective projecting portions 56, 57 and 58 of the relay connector 10 are engaged with the inner peripheral surface of the receptacle 130 of the mating housing 101 in the circumferential direction of the first connector fitting portion 50. Specifically, each projecting portion 56 is engaged with an inner surface defining the first groove 131 in the circumferential direction of the first connector fitting portion 50. The projecting portion 57 is engaged with an inner surface defining the second groove 132 in the circumferential direction of the first connector fitting portion 50. Each projecting portion 58 is engaged with an inner surface defining the third groove 133 in the circumferential direction of the first connector fitting portion 50.

Next, functions and effects of this embodiment are described.

(1) The relay connector 10 is provided with the housing 20 including the tubular inserting portion 40 to be inserted into the mounting hole 201 of the device case 200 and the electrically conductive terminals 23 provided to be partially embedded in the housing 20. The relay connector 10 is provided with the sealing member 24 to be mounted on the outer periphery of the inserting portion 40 and configured to seal between the mounting hole 201 and the inserting portion 40. The housing 20 includes the primary molded portion 21 molded with the terminals 23 as inserts and the secondary molded portion 22 molded with the primary molded portion 21 including the terminals 23 as an insert. The primary molded portion 21 includes the first body portion 31 for holding the terminals 23 and the tubular first connector fitting portion 50 projecting in the first direction X1 from the end surface in the first direction X1 of the first body portion 31 and provided in the internal space of the inserting portion 40. The secondary molded portion 22 includes the second body portion 32 for holding the terminals 23 and covering a part of the first body portion 31 in an embedded state, and the inserting portion 40 projecting in the first direction X1 from the end surface in the first direction X1 of the second body portion 32. The secondary molded portion 22 includes the second connector fitting portion 60 projecting in the first opposite direction X2 from the end surface in the first opposite direction X2, which is a direction opposite to the first direction X1, out of the second body portion 32.

According to this configuration, the first connector fitting portion 50 projects in the first direction X1, in which the inserting portion 40 to be inserted into the mounting hole 201 of the device case 200 projects. Thus, the first connector fitting portion 50 projects toward the inside of the device case 200. Further, at least a part of the first connector fitting portion 50 is provided in the internal space of the inserting portion 40. That is, the first connector fitting portion 50 is at least partially accommodated in the internal space of the inserting portion 40, i.e. at least partially embedded in the inserting portion 40. Thus, a length of the first connector fitting portion 50 projecting in the first direction X1 from the end surface in the first direction X1 of the inserting portion 40 can be shortened as compared to the case where the base end of the first connector fitting portion 50 is connected to the end surface in the first direction X1 of the inserting portion 40. That is, a length of the first connector fitting portion 50 projecting into the device case 200 can be shortened by as much as the first connector fitting portion 50 is embedded in the inserting portion 40 as compared to the case where the end surface in the first direction X1 of the inserting portion 40 becomes the bottom wall of the first connector fitting portion 50. As a result, the interference of the relay connector 10 with other components can be suitably suppressed inside the device case 200.

(2) Further, the primary molded portion 21 including the first connector fitting portion 50 is formed separately from the secondary molded portion 22 including the inserting portion 40. Thus, it can be suppressed that the shape of the primary molded portion 21 such as the first connector fitting portion 50 is restricted due to the shape of the secondary molded portion 22 such as the inserting portion 40. In this way, a degree of freedom in the shape of the primary molded portion 21 can be improved. Further, a degree of freedom in combining the shape of the primary molded portion 21 and that of the secondary molded portion 22 can be improved. As a result, a degree of freedom in the shape of the entire relay connector 10 can be improved.

(3) The tip region of the flange portion 31B of the first body portion 31 is embedded in the second body portion 32. In this way, the first body portion 31 and the second body portion 32 are suitably integrated. Therefore, the primary molded portion 21 and the secondary molded portion 22 can be suitably integrated.

(4) The gap 41 is provided between the inner peripheral surface of the inserting portion 40 and the outer peripheral surface of the first connector fitting portion 50. Thus, the mating housing 101 of the mating connector 100 fit into the first connector fitting portion 50 can be suitably inserted into the gap 41. In this way, the mating connector 100 can be accommodated in the internal space of the inserting portion 40.

(5) The entire end surface in the first opposite direction X2 of the first body portion 31 is covered by the second body portion 32 while being held in close contact with the second body portion 32. In this way, a close contact area of the first body portion 31 and the second body portion 32 can be increased and adhesion between the first body portion 31 and the second body portion 32 can be improved.

(6) The primary molded portion 21 includes the projecting portions 56, 57 and 58 projecting radially outward from the outer peripheral surface of the first connector fitting portion 50 and to be engaged with the mating housing 101 fit into the first connector fitting portion 50 in the circumferential direction of the first connector fitting portion 50. According to this configuration, if the mating connector 100 is fit into the first connector fitting portion 50, the projecting portions 56, 57 and 58 of the primary molded portion 21 and the mating housing 101 are engaged with each other in the circumferential direction of the first connector fitting portion 50. In this way, the first connector fitting portion 50 can be suitably suppressed from relatively rotating about an axis extending in the first direction X1 with respect to the mating housing 101. As a result, the terminals 23 of the relay connector 10 can be suppressed from relatively moving with respect to the mating terminals 103 of the mating connector 100 and the wear of contact points of the terminals 23 and the mating terminals 103 can be suitably suppressed.

(7) In the first connector fitting portion 50, the projecting portions 56, 57 configured to be different from each other are respectively provided on the third peripheral wall 53 provided in the third direction Z1 and the fourth peripheral wall 54 provided in the third opposite direction Z2. Thus, the mating housing 101 of the mating connector 100 can be suppressed from being fit in a wrong posture into the first connector fitting portion 50. For example, the mating housing 101 includes the first groove 131, into which the projecting portions 56 are inserted along the first direction X1, and the second groove 132, into which the projecting portion 57 is inserted along the first direction X1. If the mating housing 101 includes the first and second grooves 131, 132 as just described, the mating housing 101 can be suitably suppressed from being fit in a wrong posture into the first connector fitting portion 50. For example, the mating connector 100 can be suppressed from being fit into the first connector fitting portion 50 while being shifted about an axis passing through a center of the first connector fitting portion 50 and extending along the first direction X1 from a correct posture with respect to the first connector fitting portion. In this way, erroneous assembling can be suitably suppressed in assembling the mating housing 101 with the first connector fitting portion 50.

(8) The primary molded portion 21 includes the engaging projection 55 projecting radially outwardly of the first connector fitting portion 50 from the outer peripheral surface of the first connector fitting portion 50. The engaging projection 55 extends along the first direction X1. The engaging projection 55 is formed to increase the projection amount from the outer peripheral surface of the first connector fitting portion 50 along the first opposite direction X2 from the end part in the first direction X1 of the engaging projection 55. According to this configuration, the mating connector 100 can be easily fixed to the first connector fitting portion 50 by providing the engaging portion 140 to be engaged with the engaging projection 55 in the mating connector 100 to be fit into the first connector fitting portion 50.

(9) The first connector fitting portion 50 is formed to have a waterproof structure so that the mating connector 100, which is a waterproof connector, is fit. According to this configuration, even if the inside of the device case 200 is an oil environment, the intrusion of a liquid such as oil into the first connector fitting portion 50 having the mating connector 100 fit thereinto can be suitably suppressed.

Other Embodiments

The above embodiment can be modified and carried out as follows. The above embodiment and the following modifications can be carried out in combination without technically contradicting each other.

The structure of the first connector fitting portion 50 in the above embodiment can be changed as appropriate.

Although the first connector fitting portion 50 is formed to have a waterproof structure in the above embodiment, there is no limitation to this. For example, the first connector fitting portion 50 may be formed to have a non-waterproof structure so that a mating connector, which is a non-waterproof connector, is fit.

Although the end part in the first direction X1 of the first connector fitting portion 50 projects in the first direction X1 from the end surface in the first direction X1 of the inserting portion 40 in the above embodiment, there is no limitation to this. For example, the first connector fitting portion 50 may be accommodated over an entire length in the axial direction in the internal space of the inserting portion 40.

The structure of the primary molded portion 21 in the above embodiment can be changed as appropriate.

The structure of the engaging projection 55 in the above embodiment can be changed as appropriate.

The structures of the projecting portions 56, 57 and 58 in the above embodiment can be changed as appropriate.

The projecting portions 56 of the above embodiment may be omitted.

The projecting portion 57 of the above embodiment may be omitted.

The projecting portions 58 of the above embodiment may be omitted.

The structure of the secondary molded portion 22 in the above embodiment can be changed as appropriate.

The second body portion 32 in the above embodiment may be formed to cover the entire end surface in the first direction X1 of the flange portion 31B.

The structure of the second connector fitting portion 60 in the above embodiment can be changed as appropriate.

The structure of the engaging projection 65 in the above embodiment can be changed as appropriate.

The structures of the projecting portions 66 in the above embodiment can be changed as appropriate.

Although the sealing member 24 is embodied as a rubber ring made of rubber in the above embodiment, there is no limitation to this. For example, a ring member made of a resilient material other than rubber may be adopted as the sealing member 24.

Although the present disclosure is embodied as the relay connector 10 to be mounted on the device case 200, which is a transmission case, in the above embodiment, there is no limitation to this. For example, the present disclosure may be applied to a relay connector used for a device case other than a transmission case. Note that the environment inside the device case 200, on which the relay connector 10 is mounted, is not limited to the oil environment. The present disclosure is also applicable to a relay connector of a device using no oil in a device case 200.

The embodiment disclosed this time should be considered illustrative in all aspects, rather than restrictive. The scope of the present invention is represented not by the above meaning, but by claims and is intended to include all changes in the scope of claims and in the meaning and scope of equivalents.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A relay connector to be mounted on a device case for electrically connecting inside and outside of the device case, comprising:

a housing including an inserting portion to be inserted into a mounting hole of the device case, wherein the inserting portion is tubular in shape;

an electrically conductive terminal provided in a state partially embedded in the housing; and a sealing member to be mounted on an outer periphery of the inserting portion, the sealing member sealing between the mounting hole and the inserting portion, the housing including a primary molded portion formed by insert molding with the terminal as a first insert and a secondary molded portion formed by insert molding with the primary molded portion including the terminal as a second insert, the primary molded portion including a first body portion for holding the terminal and a tubular first connector fitting portion projecting in a first direction from an end surface in the first direction of the first body portion, the first connector fitting portion being provided in an internal space of the inserting portion, and the secondary molded portion including a second body portion for holding the terminal and covering the first body portion with the first body portion partially embedded, the inserting portion projecting in the first direction from an end surface in the first direction of the second body portion and a second connector fitting portion projecting in a first opposite direction from an end surface in the first opposite direction of the second body portion, the first opposite direction being opposite to the first direction, wherein an inner peripheral surface of the inserting portion surrounds an outer peripheral surface of the first connector fitting portion with a gap between the inner peripheral surface of the inserting portion and the outer peripheral surface of the first connector fitting portion.

2. A relay connector to be mounted on a device case for electrically connecting inside and outside of the device case, comprising:

a housing including an inserting portion to be inserted into a mounting hole of the device case, wherein the inserting portion is tubular in shape;

an electrically conductive terminal provided in a state partially embedded in the housing; and a sealing member to be mounted on an outer periphery of the inserting portion, the sealing member sealing between the mounting hole and the inserting portion, the housing including a primary molded portion formed by insert molding with the terminal as a first insert and a secondary molded portion formed by insert molding with the primary molded portion including the terminal as a second insert, the primary molded portion including a first body portion for holding the terminal and a tubular first connector fitting portion projecting in a first direction from an end surface in the first direction of the first body portion, the first connector fitting portion being provided in an internal space of the inserting portion, and the secondary molded portion including a second body portion for holding the terminal and covering the first body portion with the first body portion partially embedded, the inserting portion projecting in the first direction from an end surface in the first direction of the second body portion and a second connector fitting portion projecting in a first opposite direction from an end surface in the first opposite direction of the second body portion, the first opposite direction being opposite to the first direction, wherein:

the first body portion includes a bottom wall portion for closing an opening in the first opposite direction of the first connector fitting portion and a flange portion formed continuously and integrally with the bottom wall portion, the flange portion projecting radially outwardly of the first connector fitting portion from an outer peripheral surface of the first connector fitting portion, and the second body portion covers a tip region of the flange portion with the tip region embedded.

3. The relay connector of claim 2, wherein:

an end part in the first direction of the first connector fitting portion projects in the first direction from an end surface in the first direction of the inserting portion, an inner peripheral surface of the inserting portion surrounds the outer peripheral surface of the first connector fitting portion with a gap provided between the outer peripheral surface of the first connector fitting portion and the inner peripheral surface of the inserting portion, and a part not covered by the second body portion, out of an end surface in the first direction of the flange portion, is exposed in the gap.

4. The relay connector of claim 2, wherein:

the second body portion covers in close contact with an entire end surface in the first opposite direction of the first body portion, the first connector fitting portion surrounds an outer periphery of the terminal projecting in the first direction from the end surface in the first direction of the first body portion, and the second connector fitting portion surrounds the outer periphery of the terminal projecting in the first opposite direction from the end surface in the first opposite direction of the second body portion.

5. The relay connector of claim 1, wherein the primary molded portion includes one or more projecting portions projecting radially outwardly of the first connector fitting portion from an outer peripheral surface of the first connector fitting portion and to be engaged with a mating housing of a mating connector fit in the first connector fitting portion in a circumferential direction of the first connector fitting portion.

6. The relay connector of claim 5, wherein:

the first connector fitting portion is formed into a rectangular tube shape, the first connector fitting portion includes a first peripheral wall provided in a second direction orthogonal to the first direction, a second peripheral wall provided in a second opposite direction, the second opposite direction being opposite to the second direction, a third peripheral wall provided in a third direction orthogonal to both the first direction and the second direction, and a fourth peripheral wall provided in a third opposite direction, the third opposite direction being opposite to the third direction, and the projecting portions include a plurality of first projecting portions provided on the third peripheral wall and one second projecting portion provided on the fourth peripheral wall.

7. The relay connector of claim 1, wherein:

the primary molded portion includes an engaging projection projecting radially outwardly of the first connector fitting portion from an outer of the first connector fitting portion, the engaging projection extends along the first direction, and the engaging projection is formed to increase a projection amount from the outer peripheral surface of the first connector fitting portion along the first opposite direction from an end part in the first direction of the engaging projection.

8. A relay connector to be mounted on a device case for electrically connecting inside and outside of the device case, comprising:

a housing including an inserting portion to be inserted into a mounting hole of the device case, wherein the inserting portion is tubular in shape;

an electrically conductive terminal provided in a state partially embedded in the housing; and a sealing member to be mounted on an outer periphery of the inserting portion, the sealing member sealing between the mounting hole and the inserting portion, the housing including a primary molded portion formed by insert molding with the terminal as a first insert and a secondary molded portion formed by insert molding with the primary molded portion including the terminal as a second insert, the primary molded portion including a first body portion for holding the terminal and a tubular first connector fitting portion projecting in a first direction from an end surface in the first direction of the first body portion, the first connector fitting portion being provided in an internal space of the inserting portion, and the secondary molded portion including a second body portion for holding the terminal and covering the first body portion with the first body portion partially embedded, the inserting portion projecting in the first direction from an end surface in the first direction of the second body portion and a second connector fitting portion projecting in a first opposite direction from an end surface in the first opposite direction of the second body portion, the first opposite direction being opposite to the first direction, wherein:

the first connector fitting portion has a tubular shape formed by a peripheral wall continuous over an entire periphery of the first connector fitting portion in a circumferential direction, and the first connector fitting portion is formed to have a waterproof structure so that a mating connector is fit, the mating connector being a waterproof connector.

* * * * *